United States Patent
Walsh et al.

(10) Patent No.: US 11,397,963 B2
(45) Date of Patent: Jul. 26, 2022

(54) MULTI-AXIS BLOCKCHAIN CLEARANCE OF OFFERS

(71) Applicant: Quotient Technology Inc., Mountain View, CA (US)

(72) Inventors: Michael Walsh, San Franciso, CA (US); Venkata Radha Krishna Proddaturi, Santa Clara, CA (US); Joshua Arteaga, Mountain View, CA (US); Ehsan Hoque, Pleasanton, CA (US)

(73) Assignee: QUOTIENT TECHNOLOGY INC., Mountain View, CA (US)

( * ) Notice: Subject to any disclaimer, the term of this patent is extended or adjusted under 35 U.S.C. 154(b) by 266 days.

(21) Appl. No.: 16/824,783

(22) Filed: Mar. 20, 2020

(65) Prior Publication Data

US 2020/0302470 A1 Sep. 24, 2020

Related U.S. Application Data

(60) Provisional application No. 62/822,282, filed on Mar. 22, 2019.

(51) Int. Cl.
*G06Q 30/02* (2012.01)
*G06Q 20/38* (2012.01)
(Continued)

(52) U.S. Cl.
CPC ..... *G06Q 30/0238* (2013.01); *G06Q 20/3827* (2013.01); *H04L 9/0637* (2013.01); *H04L 9/50* (2022.05); *H04L 2209/56* (2013.01)

(58) Field of Classification Search
CPC .......... G06Q 30/0238; G06Q 20/3827; G06Q 20/02; G06Q 20/387; G06Q 20/389;
(Continued)

(56) References Cited

U.S. PATENT DOCUMENTS 9,773,212 B2 * 9/2017 Hammad ............... G06Q 10/00
2008/0154676 A1 * 6/2008 Suk ........................ G06Q 30/02
705/14.26
(Continued)

FOREIGN PATENT DOCUMENTS

WO  WO 2018/102030 A1  6/2018
WO  WO 2019/009975 A1  1/2019
WO  WO2019/034969 A1  2/2019

OTHER PUBLICATIONS

The International Searching Authority, "Search Report" in application No. PCT/US20/23948, dated Jun. 11, 2020, 16 pages.
(Continued)

*Primary Examiner* — Thuy N Nguyen
(74) *Attorney, Agent, or Firm* — Baker Botts, L.L.P.

(57) ABSTRACT

In an embodiment, a computer-implemented method providing improvements in clearance of offers, comprising receiving redemption transaction metadata from a first computing device controlled by a first entity, the redemption transaction metadata relating to a point of sale transaction using a coupon associated with a coupon campaign; in response to approving the coupon for redemption, posting a redemption transaction to be written on two independent redemption blockchains including a first redemption blockchain associated with the first entity and a second redemption blockchain associated with the coupon campaign, the redemption transaction including at least a portion of the redemption transaction metadata; receiving payout transaction metadata from a second computing device controlled by a second entity associated with the coupon campaign, the payout transaction metadata relating to a payout event that corresponds with a redemption transaction written on the second redemption blockchain.

20 Claims, 9 Drawing Sheets

(51) Int. Cl.
*H04L 9/06* (2006.01)
*H04L 9/00* (2022.01)

(58) Field of Classification Search
CPC ....... G06Q 2220/00; G06Q 30/0207–30/0277; H04L 9/0637; H04L 2209/38; H04L 2209/56; H04L 9/3239
See application file for complete search history.

(56) References Cited

U.S. PATENT DOCUMENTS

| | | | | |
|---|---|---|---|---|
| 2008/0255944 | A1* | 10/2008 | Shah | H04L 67/22 705/14.47 |
| 2013/0024254 | A1* | 1/2013 | Libenson | G06Q 30/02 705/14.1 |
| 2013/0275197 | A1* | 10/2013 | Thibedeau | G06Q 20/202 705/14.26 |
| 2013/0325587 | A1* | 12/2013 | Kothari | G06Q 30/0243 705/14.42 |
| 2015/0278820 | A1* | 10/2015 | Meadows | G06Q 20/40145 705/64 |
| 2016/0012465 | A1* | 1/2016 | Sharp | G06Q 20/321 705/14.17 |
| 2017/0364936 | A1* | 12/2017 | Balfour | G06Q 20/204 |
| 2018/0253464 | A1* | 9/2018 | Kohli | H04L 9/3247 |
| 2018/0268401 | A1* | 9/2018 | Ortiz | G06Q 20/36 |
| 2018/0315072 | A1* | 11/2018 | Rubin | G06Q 20/387 |
| 2019/0073666 | A1* | 3/2019 | Ortiz | G06Q 20/3674 |
| 2019/0303976 | A1* | 10/2019 | Wöhle | G06Q 30/0271 |
| 2019/0347624 | A1* | 11/2019 | Pustizzi | G06Q 20/3274 |
| 2020/0076574 | A1* | 3/2020 | Austin | G06Q 20/382 |
| 2020/0226630 | A1* | 7/2020 | Balfour | G06Q 20/38215 |
| 2020/0250694 | A1* | 8/2020 | Mock | G06Q 20/40 |
| 2020/0265516 | A1* | 8/2020 | Xu | G06Q 40/04 |
| 2021/0126784 | A1* | 4/2021 | Luce | G06F 21/6263 |
| 2021/0192513 | A1* | 6/2021 | James | G06Q 40/12 |

OTHER PUBLICATIONS

Current Claims in application No. PCT/US20/23948, dated Jun. 2020, 5 pages.

\* cited by examiner

Receiving redemption transaction metadata from a first computing device controlled by a first entity, the redemption transaction metadata relating to a point of sale transaction using a coupon associated with a coupon campaign

710

In response to approving the coupon for redemption, posting a redemption transaction to be written on two independent redemption blockchains

715

Receiving payout transaction metadata from a second computing device controlled by a second entity associated with the coupon campaign, the payout transaction metadata relating to a payout event that corresponds with a redemption transaction written on the second redemption blockchain

MULTI-AXIS BLOCKCHAIN CLEARANCE OF OFFERS

BENEFIT CLAIM

This application claims the benefit under 35 U.S.C. § 119(e) of Provisional Application 62/822,282, filed Mar. 22, 2019, the entire contents of which is hereby incorporated by reference as if fully set forth herein.

FIELD OF THE DISCLOSURE

One technical field of this disclosure is computer-implemented redemption and payment of offers over distributed computer networks and the internet. Another technical field is applications of digital ledgers and blockchains.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Offers to consumers such as printed cents-off coupons, digital coupons and other electronic offers have entered wide use with the ubiquitous availability of distributed computer systems, internetworks, and mobile computing. When consumers present valid offers to merchants for redemption, a clearance and reconciliation process is needed to transfer digital value from brand owners or offer publishers to merchants who have given discounts or other consideration to consumers at the point of redemption. Today, proxy companies are used to provide scanning, auditing, and negotiations between retailers and consumer packaged goods (CPG) manufacturers. These proxy companies receive data on coupons that have been redeemed in stores. They count, audit and present for payment. Any discrepancies between the retailer and the CPG manufacturers are addressed by the proxy companies. After all discrepancies are resolved, the proxy companies receive payment and pay as an escrow service. This relationship model is a legacy of two eras: paper coupons and centralized systems.

As today's coupon industry transitions from paper coupons to digital coupons, the manual clearing relationship remains despite simpler reporting, invoicing, and direct payments being available using automatic reconciliation. This continues an economic process where the escrow companies are taking a share of value that could otherwise be used for additional coupon budget. It is expected that these opportunities have faced resistance due to the nature of centralized systems and trust between business partners.

Current solutions have continued to approach the problem of needing an escrow service by creating centralized platforms of data. However, these centralized platforms must be integrated and trusted by all parties in the coupon process. Depending on the implementation, they may also need to reach a certain scale to have long term viability. However, this also creates an audit gap between parties as retailers, CPG manufacturers and platforms continue to maintain their own databases with differing counts.

Based on the foregoing, there is a need for a system that removes audit gaps between parties by ensuring all of the parties have same consistent information.

SUMMARY

The appended claims may serve as a summary of the disclosure.

BRIEF DESCRIPTION OF THE DRAWINGS

The present invention is illustrated by way of example, and not by way of limitation, in the figures of the accompanied drawings and in which like reference numerals refer to similar elements and in which.

DETAILED DESCRIPTION

In the following description, for the purposes of explanation, numerous specific details are set forth in order to provide a thorough understanding of the present disclosure. It will be apparent, however, that the present invention may be practiced without these specific details. In other instances, well-known structures and devices are shown in block diagram form in order to avoid unnecessarily obscuring the present disclosure.

Embodiments are described in sections according to the following outline:

1.0 GENERAL OVERVIEW
2.0 ENVIRONMENT OVERVIEW
2.1 BLOCKCHAIN ARCHITECTURE
2.2 TRANSACTION LIFECYCLE
3.0 PROCEDURAL OVERVIEW
4.0 TECHNICAL BENEFITS
5.0 HARDWARE OVERVIEW
6.0 OTHER ASPECTS OF DISCLOSURE

1.0 General Overview

Systems and methods for implementing multi-axis blockchains are described herein. A server computer, controlled by a coupon provider, is the master or leader node in two different but related blockchains: one for a retailer and another for a consumer packaged goods (CPG) manufacturer's coupon campaign. The coupon provider is a party to both blockchains and posts transactions to both blockchains, keeping them in sync with one another. Posting to both blockchains allows transactions to be represented in multiple dimensions. In this manner, the retailer is able to view all redemptions that happen at its store regardless of which coupon campaigns they are for, and the CPG manufacturer is able to see the redemptions of all coupons for a particular coupon campaign regardless of which retailers redeemed the coupons. By ensuring all parties have equal information, the overhead in managing redemptions is reduced or even eliminated.

In an embodiment, a computer-implemented method providing improvements in clearance of offers, comprises receiving redemption transaction metadata from a first computing device or node controlled by a first entity. The first entity may be a retailer. The redemption transaction metadata originating at and relating to a point of sale transaction using a coupon associated with a coupon campaign. The redemption transaction metadata may have user and product metadata along with the coupon. The method further comprises, in response to approving the coupon for redemption, posting a redemption transaction to be written on two independent redemption blockchains including a first redemption blockchain associated with the first entity or retailer and a second redemption blockchain associated with the coupon campaign or CPG. The redemption transaction includes at least a portion of the redemption transaction metadata. The method further comprises receiving payout transaction metadata from a second computing device controlled by a second entity associated with the coupon campaign. The payout transaction metadata relates to a payout event that corresponds with a redemption transaction written on the second redemption blockchain.

Other features, aspects and embodiments will become apparent from the disclosure as a whole including the drawings and claims.

2.0 Environment Overview

Figure 1A:
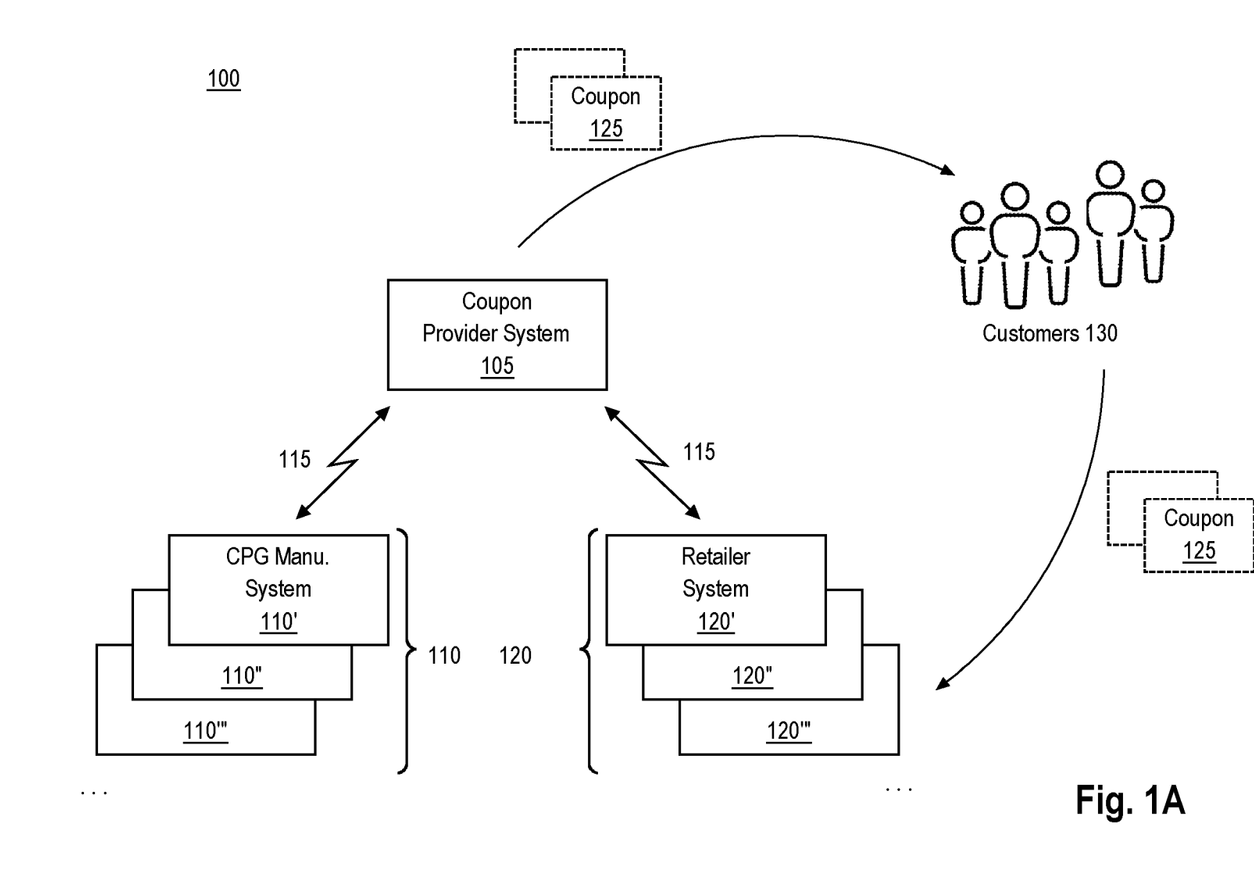
FIG. 1A illustrates an example environment in accordance with some embodiments.

FIG. 1A illustrates an example environment 100 in accordance with some embodiments. The environment 100 includes a coupon provider system 105 and different organizations, including one or more CPG manufacturer systems 110 (collectively) and one or more retailer systems 120 (collectively). A CPG manufacturer system may be a manufacturer or any organization which produces goods. A retailer system may be a retailer or any organization which pays a consumer for a coupon/rebate. The coupon provider system 105 is controlled by, used by or otherwise associated with a coupon provider, such as Quotient Technologies Inc. Similarly, each of the CPG manufacturer systems is controlled by, used by or otherwise associated with a CPG manufacturer, and each of the retailer systems 120 is controlled by, used by or otherwise associated with a retailer.

At the CPG manufacturers' requests, the coupon provider system 105 generates paper and/or digital coupons 125 for different coupon campaigns to be used by customers 130 at the one or more retailers 120 within the environment 100. Each of the coupon provider system 105, the CPG manufacturer systems 110, and the retailer systems 120 includes one or more computers that host or execute stored programs that provide the functions and operations that are described herein in connection with coupon transactions and blockchain operations.

The coupon provider system 105 is operatively coupled with the organizations 110, 120 by communication links 115 over a network. A network broadly represents a combination of one or more local area networks, wide area networks, global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network.

Figure 1B:
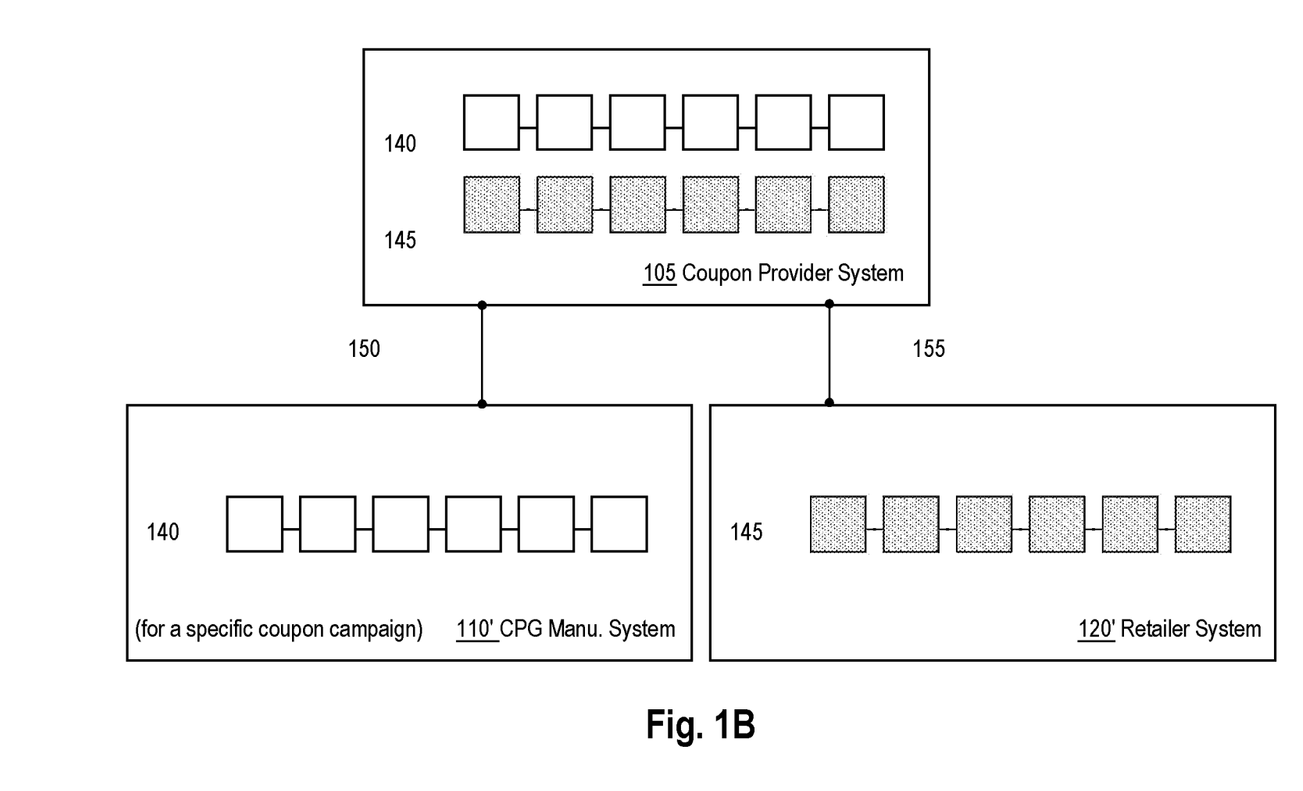
FIG. 1B illustrates example distributed networks of interconnected computers with blockchains in accordance with some embodiments.

As is further explained below, a redemption digital ledger is distributed to nodes within a distributed network including the coupon provider system 105 and an organization, such as a CPG manufacturer 110 or a retailer 120. FIG. 1B illustrates example distributed networks 150, 155 of interconnected computers 105, 110', 120' of FIG. 1A with blockchains 140, 145. For simplicity of illustration, FIG. 1B illustrates only two distributed networks 150, 155. The distributed network 150 includes, as nodes, the coupon provider system 105 and the CPG manufacturer system 110' associated with a specific coupon campaign. Updates (for example, new redemption transactions) sent over the network 115 to the redemption blockchain 140 are independently constructed and recorded/written by each of these two nodes 105, 110' in the distributed network 150. The distributed network 155 includes, as nodes, the coupon provider system 105 and the retailer system 120'. Updates (for example, new redemption transactions) sent over the network 115 to the redemption blockchain 145 are independently constructed and recorded/written by each of these two nodes 105, 120' in the distributed network 155. The coupon provider 105 is a party to both redemption blockchains 140, 145, while the CPG manufacturer 110' and the retailer 120' are not parties to each other's redemption blockchain. Put differently, copies of the CPG manufacturer's redemption blockchain 140 for the coupon campaign are stored at the coupon provider system 105 and the CPG manufacturer system 110' but not at the retailer system 120'. Similarly, copies of the retailer redemption blockchain 145 are stored at the coupon provider system 105 and the retailer system 120' but not at the CPG manufacturer system 110'. However, copies of all blockchains may be shared with any approved third parties.

In some embodiments, the coupon provider system 105 is configured as a master node in these two different but related redemption blockchains 140, 145. As the master node, the coupon provider system 105 posts redemption transactions to be written to both blockchains 140, 145, keeping them in sync with one another. In some embodiments, the blockchain 140 may be initialized after the coupon for the coupon campaign is generated. In some embodiments, the blockchain 145 may be initialized after the retailer 120 enters the environment 100.

Although only two distributed networks 150, 155 are illustrated in FIG. 1B, it will be appreciated that the environment 100 of FIG. 1 may include at least as many distributed networks as there are coupon campaigns and retailers 120 within the environment 100. In some embodiments, the coupon provider system 105 and an organization 110, 120 are the only nodes in a distributed network.

2.1 Blockchain Architecture

Figure 2:
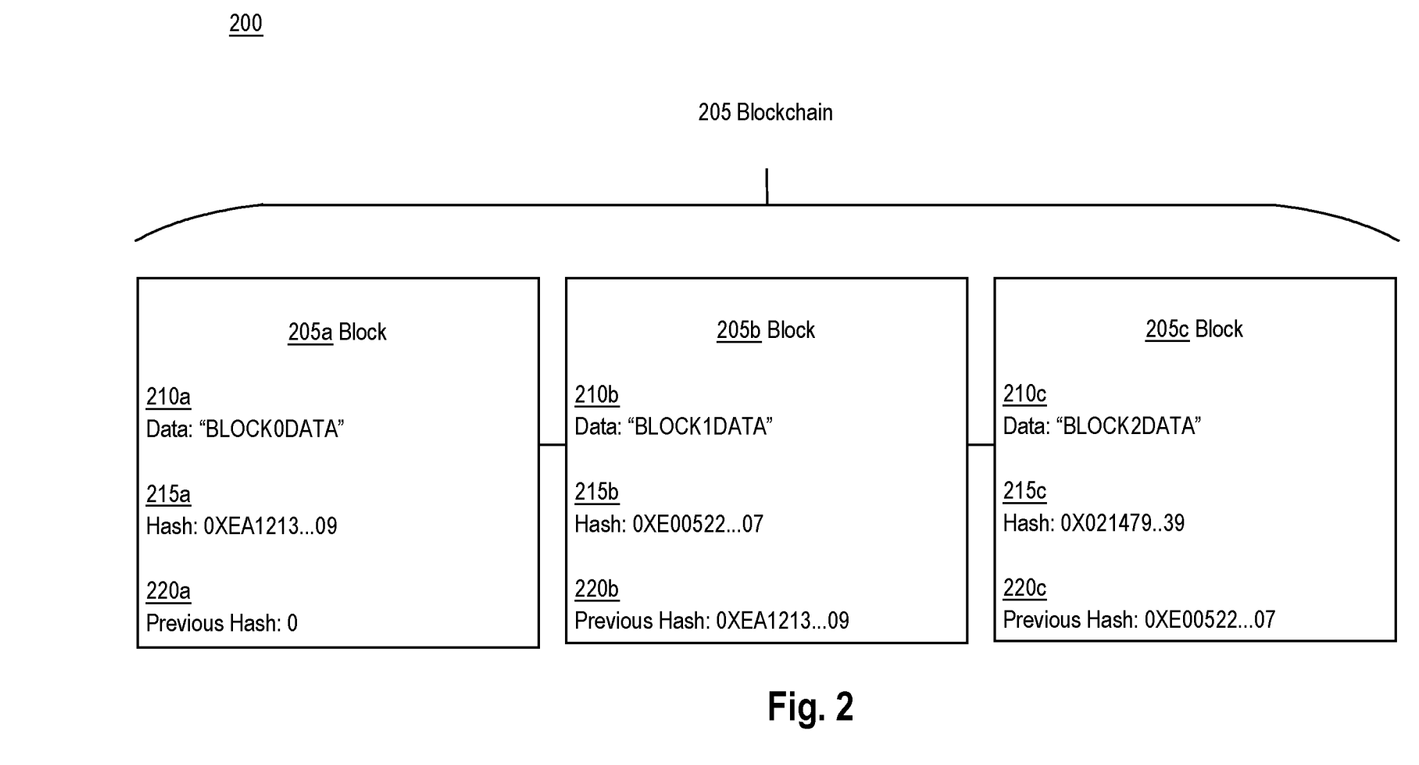
FIG. 2 illustrates an example digital blockchain database in accordance with some embodiments.

A blockchain functions as a decentralized digital ledger that tracks numerous entries, such as successful coupon redemptions. The distributed system utilizes a distributed blockchain database to store data, thereby using a consensus network for increased data security. FIG. 2 illustrates an example digital blockchain database 200 in accordance with some embodiments. The digital blockchain database 200 comprises a blockchain 205. The blockchain 205 may comprise blocks 205a, 205b, 205c of linked data that are stored in the interconnected network of computers, with suitable stored programs at those computers to support ordered creation and transmission of blockchain data. The blockchain 205 forms a distributed database that maintains a continuously growing list of ordered records, termed blocks, that are timestamped and linked to a previous block. Each block in the series of blocks is linked together chronologically, with each new block containing a hash of the previous block. Each node in a network of computers may store the entire record of linked data blocks. This creates a consensus network of computers that can verify the integrity of each block of data and the integrity of the entire blockchain 200. The blockchain 200 functions as a distributed database that ensures the integrity of the data by utilizing cryptographic hash functions to link each block to its previous block and storing the entire record of data blocks at each node.

The digital blockchain database 200 comprises the blockchain 205 including blocks 205a, 205b, 205c. The blockchain 205 may include any number of blocks. In the example of FIG. 2, each block 205a, 205b, 205c may include its own data 210a, 210b, 210c, a hash 215a, 215b, 215c of its data, and a previous hash 220a, 220b, 220c of the previous block. The data 210 for a block may include its own index number, a pointer to a related block in the same or different blockchain, and metadata regarding a point of sale transaction, such as date and timestamp, coupon value, product details, store number, register number, transaction number, loyalty card number, employee ID, and the like. Depending on application, more or less data may be included in a block. The previous hash 220 is the hash of the previous block, which links the blocks in sequence.

In the example of FIG. 2, block 205b stores a record of previous hash 220b for block 205a, while block 205c stores a record of previous hash 220c for block 205b. These records of previous hashes link each new block to the previous block to form a chain that allows for integrity checks of each block. Block 205a is the first block in the blockchain 205 and is referred to as the genesis block as it is the ancestor that every other block in the blockchain 205 can trace its lineage back to. Block 205a is the only block in the blockchain 205 that does not reference to a previous block and is of index 0.

In some embodiments, coupon campaign redemption blockchains, such as the coupon campaign redemption blockchain 140 of FIG. 1B, are similarly configured as the blockchain 205. Likewise, retailer redemption blockchains, such as the retailer redemption blockchain 145 of FIG. 1B, are similarly configured as the blockchain 205. In some embodiments, the genesis block of each of the blockchains 140, 145 is constructed by the coupon provider 105.

2.2 Transaction Lifecycle

Figure 3:
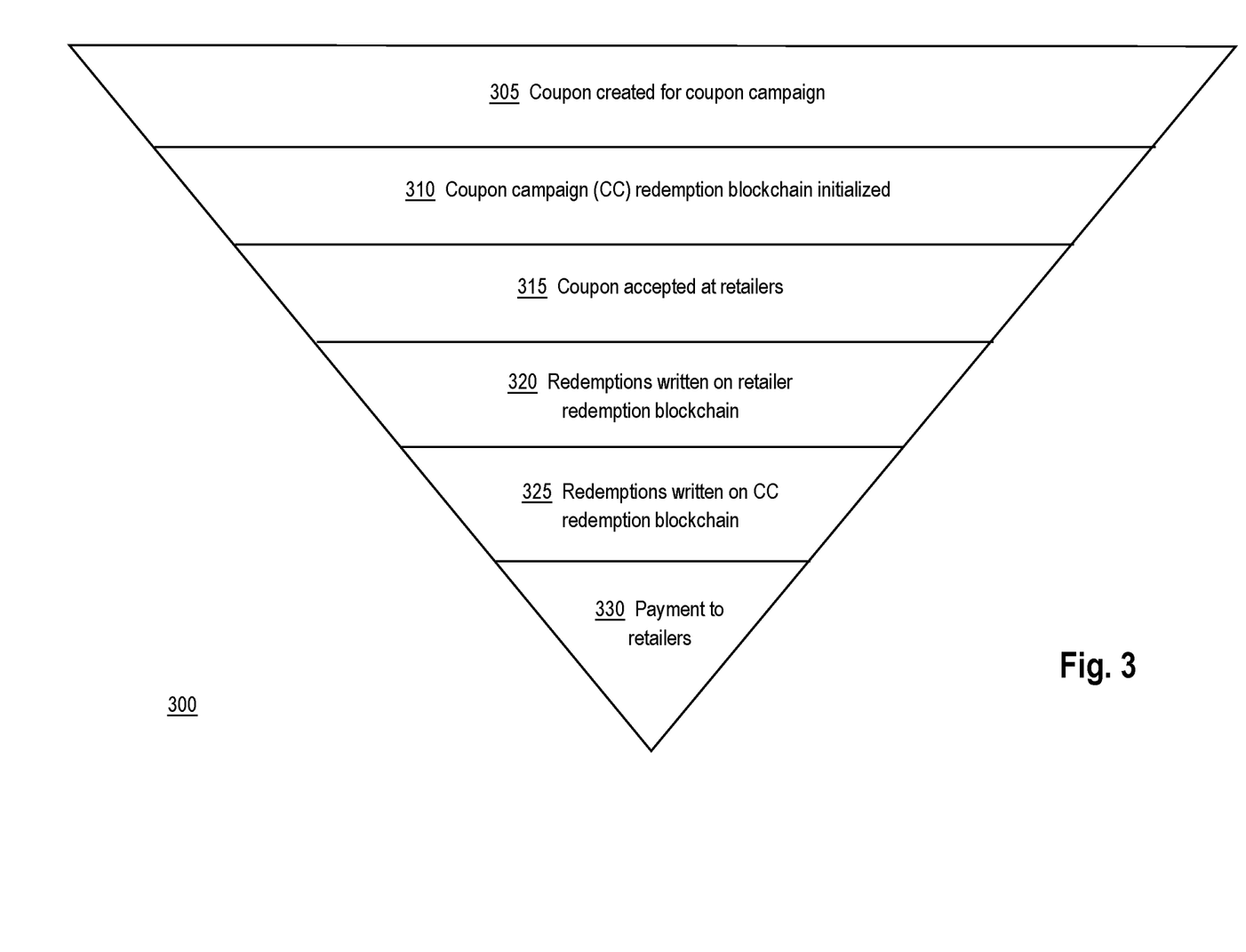
FIG. 3 illustrates an example transaction lifecycle in accordance with some embodiments.

FIG. 3 illustrates an example transaction lifecycle 300 in accordance with some embodiments. The lifecycle 300 begins with stage 305, where a coupon for a coupon campaign is generated by the coupon provider, at the request of a CPG manufacturer.

At stage 310, a new coupon campaign redemption blockchain is initialized by the coupon provider. This coupon campaign redemption blockchain is a private chain between the CPG manufacturer and the coupon provider and, if any, any approved third parties.

After the coupon campaign redemption blockchain is initialized, at stage 315, the coupon for the coupon campaign is accepted at the various retailers within the environment.

At stage 320, all redemption transactions at each retailer within the environment are written on its respective retailer redemption blockchain in real-time as the redemptions occur at point of sale. A redemption transaction may be for a redemption of a coupon associated with the coupon campaign generated at stage 305 or may be for a redemption of a different coupon campaign. During the writing process, the retailer sends the coupon provider redemption metadata regarding the point of sale transaction and, in return, receives a response from the coupon provider informing whether the coupon used during the point of transaction is approved or denied. A coupon can be denied for different reasons including, but not limited to, expiration of the coupon or if qualification(s) are not met. If the coupon provider approves the coupon, the coupon provider posts a redemption transaction to be written on the retailer redemption blockchain. The redemption transaction includes the redemption metadata.

Figure 4:
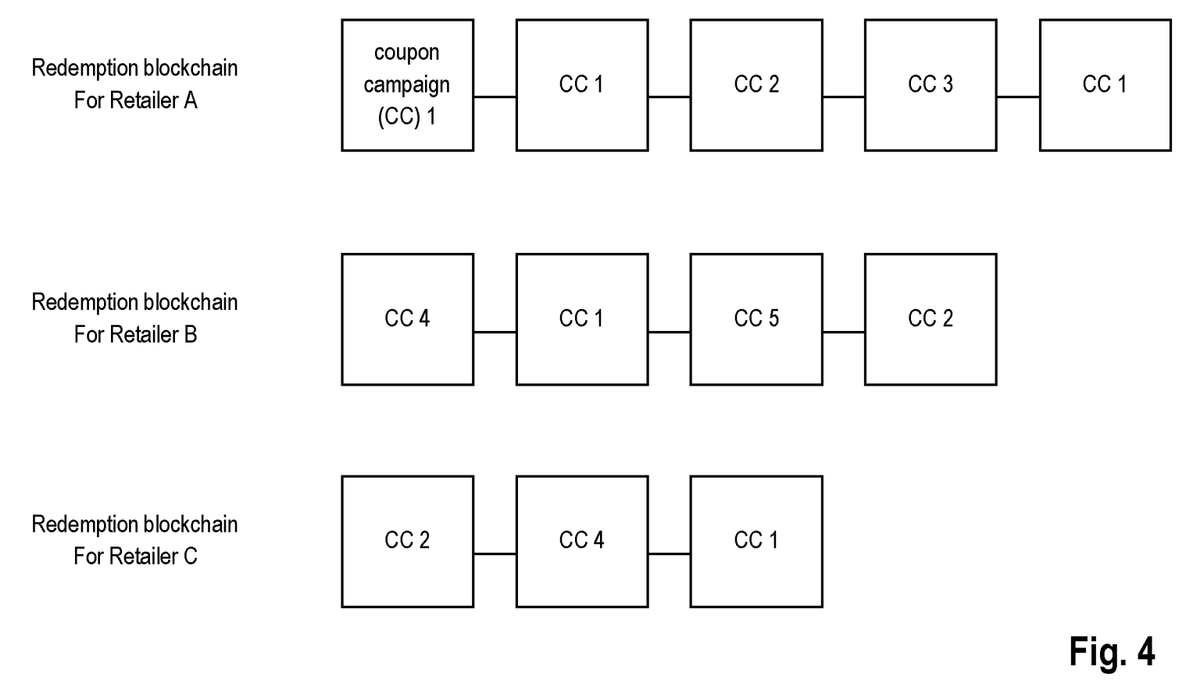
FIG. 4 illustrates example retailer redemption blockchains in accordance with some embodiments.

FIG. 4 illustrates example retailer redemption blockchains in accordance with some embodiments. Each retailer has a copy of its own retailer redemption blockchain, writes redemption transactions to its retailer redemption blockchain and, therefore, is able to view all redemption transactions that happen at its store regardless of the coupon campaigns they are for. In FIG. 4, the redemption blockchain for Retailer A includes five blocks in connection with redemption transactions associated with coupon campaign (CC) 1, CC 1, CC 2, CC 3, and CC 1, respectively, as corresponding coupons are successfully redeemed at Retailer A. The redemption blockchain for Retailer B includes four blocks in connection with redemption transactions associated with CC 4, CC 1, CC 5, and CC 2, respectively, as corresponding coupons are successfully redeemed at Retailer B. The redemption blockchain for Retailer C includes three blocks in connection with redemption transactions associated with CC 2, CC 4, and CC 1, respectively, as corresponding coupons are successfully redeemed at Retailer C.

Returning to the transaction lifecycle 300 of FIG. 3, when a redemption transaction has been written to a retailer's redemption blockchain, at stage 325, the coupon provider posts the redemption transaction to be written on the coupon campaign redemption blockchain associated with the coupon redeemed. In some embodiments, based on privacy policy, customer loyalty card number, employee ID, and other information not pertinent to the CPG manufacturer are removed from the redemption metadata before the redemption transaction is written on the coupon campaign redemption blockchain. The coupon campaign redemption blockchain is an accumulation of all redemptions for the coupon campaign across all retailers that have successfully redeemed coupons associated with the coupon campaign.

Figure 5:
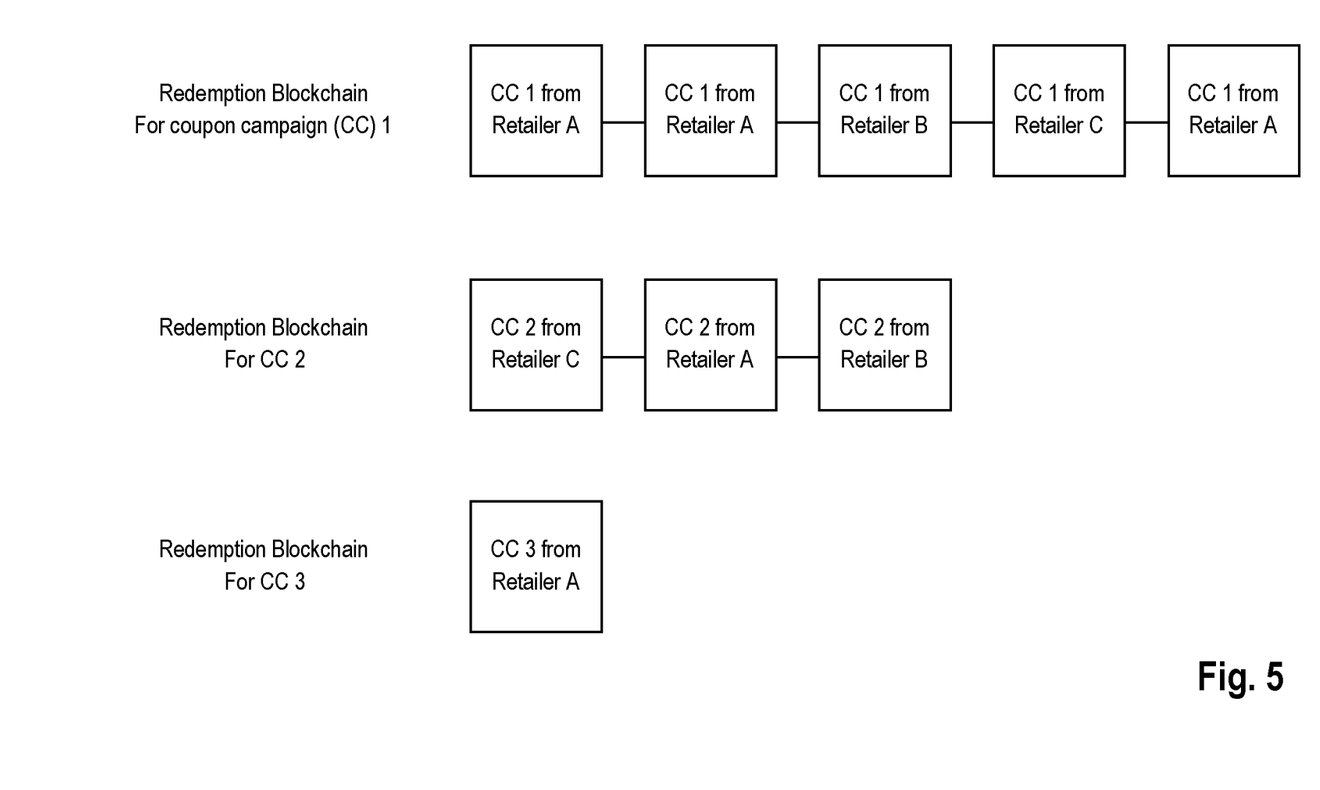
FIG. 5 illustrates example coupon campaign redemption blockchains in accordance with some embodiments.

FIG. 5 illustrates example coupon campaign redemption blockchains in accordance with some embodiments. Each CPG manufacturer has a redemption blockchain per coupon campaign, writes redemption transactions relating to a coupon campaign on a corresponding coupon campaign blockchain and, therefore, is able to view all redemptions for the coupon campaign regardless of which retailers redeemed the coupons. In FIG. 5, the redemption blockchain for CC 1 includes five blocks in connection with redemption transactions at Retailer A, Retailer A, Retailer B, Retailer C, and Retailer A, respectively. The redemption blockchain for CC 2 includes three blocks in connection with redemption transactions at Retailer C, Retailer A, and Retailer B, respectively. The redemption blockchain for CC 3 includes a block in connection with a redemption transaction at Retailer C. The coupon campaign blockchains can be the same CPG manufacturer or for different CPG manufacturers.

In some embodiments, based on the coupon provider's complete knowledge of all transactions that occur within the environment, redemption transactions may be written on both the coupon campaign redemption blockchain and the retailer redemption blockchain with a pointer to both to enable traversing during any subsequent operations. Posting redemption transactions to both the coupon campaign redemption blockchain and the retailer redemption blockchain allows the redemption transactions to be represented in different dimensions, thereby forming a multi-dimension or multi-axis blockchain. The multi-axis blockchain provides consistency of redemption transactions as these redemption transactions are shared between, at least, the retailer and the CPG manufacturer associated with the coupon campaign, thereby advantageously eliminating audit gaps between parties in traditional platforms where the parties maintain their own databases with differing counts.

Returning again the transaction lifecycle 300 of FIG. 3, at stage 330, after redemption transactions are registered across or otherwise written on both redemption blockchains (the coupon campaign's and the retailer's) with identical veracity, payout events occur either immediately, as the redemption transactions are written, or on scheduled intervals. In some embodiments, payout events are initiated from the coupon campaign redemption blockchain to the retailer(s) requiring reimbursement. The CPG manufacturer sends the coupon provider payout metadata regarding a payout event. In response, the coupon provider posts a payment transaction to be written on the coupon campaign redemption blockchain and the retailer redemption blockchain, thus completing the transaction lifecycle 300. Although it has been described that payout transactions are written on the redemption blockchains, it is contemplated that payout transactions can be written on payout blockchains that are separate and distinct from the redemption blockchains. In some embodiments, the payout blockchains are similarly configured as the redemption blockchains with regards to, at least, initialization and privacy.

Figure 6:
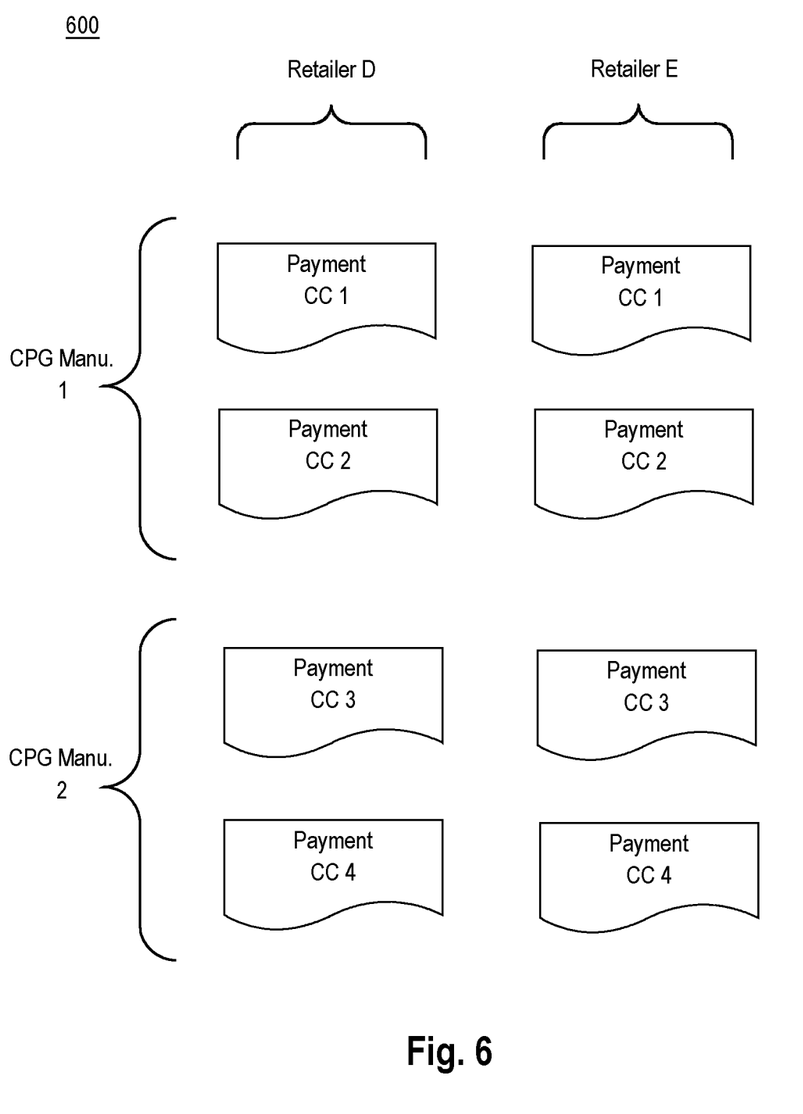
FIG. 6 illustrates an example representation of payment events in accordance with some embodiments.

FIG. 6 illustrates an example virtual representation 600 of payout transactions in accordance with some embodiments. In FIG. 6, two retailers: Retailer D and Retailer E, and four coupon campaigns: CC 1, CC 2, CC 3, and CC 4, are illustrated. CC 1 and CC 2 are associated with one CPG manufacturer (CPG 1), and CC 3 and CC 4 are associated with a different CPG manufacturer (CPG 2). Horizontal payout transactions are payments made by CPG 1 and CPG 2 for CC 1, CC 2, CC3, and CC 4 to the Retailer D and Retailer E, while vertical payout transactions are payments received by Retailer D and Retailer E for CC 1, CC 2, CC 3, and CC 4, from CPG 1 and CPG 2. The multi-dimensional representation 600 advantageously allows CPG manufacturers and retailers to confirm payments as payout transactions are shared between respective CPG manufacturers and respective retailers.

3.0 Procedural Overview

Figure 7:
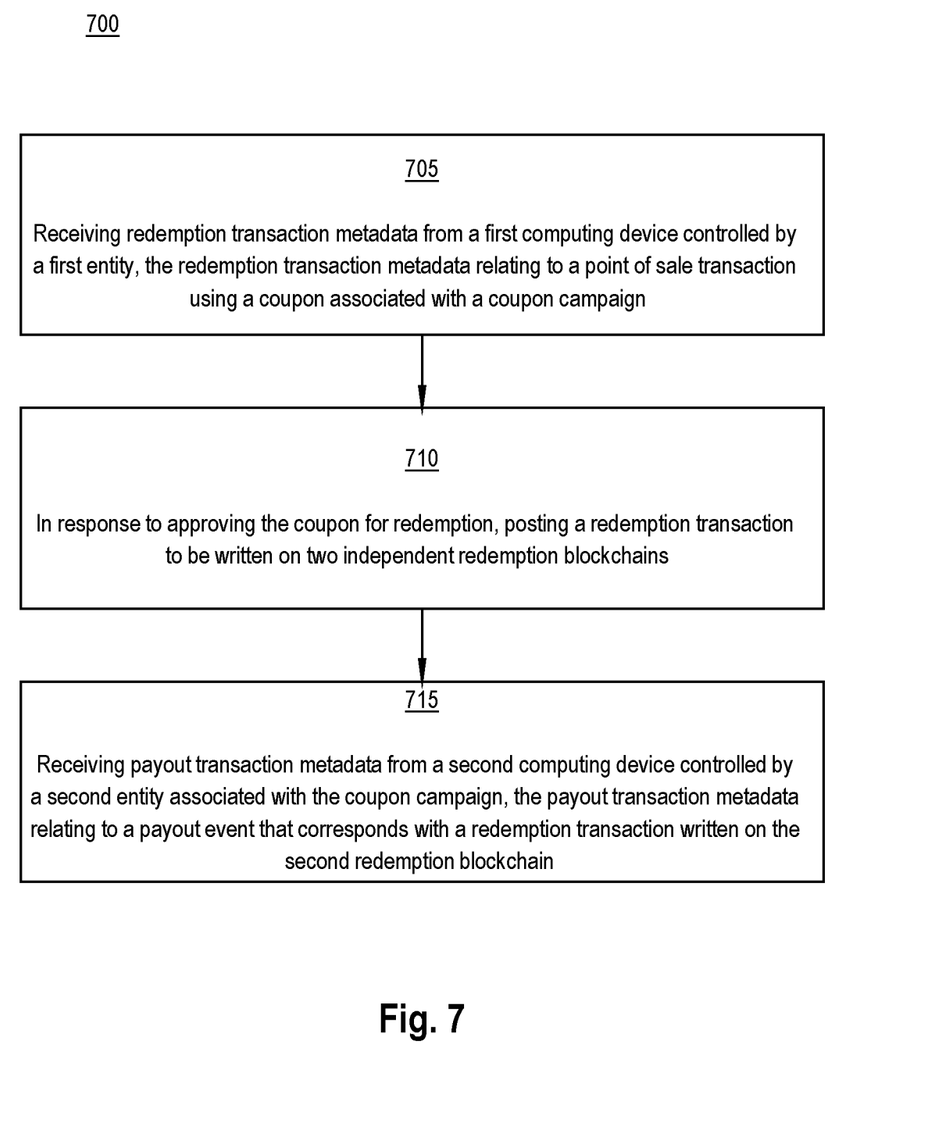
FIG. 7 illustrates an example method for generating a multi-axis blockchain in accordance with some embodiments.

FIG. 7 illustrates an example method 700 for generating a multi-axis blockchain in accordance with some embodiments. In particular, the method 700 is performed by one or more computers at the coupon provider system 105 of FIG. 1, which will be referred to as a server computer in the following discussion. For ease of description, the method 700 is described with reference to a single coupon campaign. However, it will be appreciated that the method 700 can be performed for multiple coupon campaigns without departing from the scope of the present disclosure.

The method 700 begins at step 705, where the server computer receives redemption transaction metadata from a first computing device controlled by a first entity. The first entity is typically a retailer 120 in the environment 100 of FIG. 1. The redemption transaction metadata is related to a point of sale transaction using a coupon associated with the coupon campaign, at the first entity. The transaction metadata may include date and timestamp, store number, register number, transaction number, customer loyalty card number, employee ID, coupon offer, and/or the like. Upon receiving the redemption transaction metadata from the first computing device, the server computer determines whether to approve or deny the coupon. A coupon can be denied for different reasons including, but not limited to, expiration of the coupon or if qualification(s) are not met during the point of sale.

At step 710, in response to approving the coupon for redemption, the server computer posts a redemption transaction to be written on independent redemption blockchains including a first redemption blockchain associated with the first entity (the retailer) and a second redemption blockchain associated with the coupon campaign. The redemption transaction includes the redemption transaction metadata.

In some embodiments, the server computer transforms the redemption transaction metadata before posting a modified redemption transaction that includes the transformed redemption transaction metadata, to be written on the second redemption blockchain, such that not all the details associated with the redemption transaction are written on the second redemption blockchain. For example, private or sensitive information like customer loyalty card number and employee ID associated with the redemption transaction are not written on the second redemption blockchain.

The first redemption blockchain and the second redemption blockchain form a multi-axis redemption blockchain by one or more redemption transactions written on both blockchains. The multi-axis redemption blockchain advantageously provides consistency of redemption transactions as these redemption transactions are shared between different entities, advantageously eliminating the need of a proxy, as required in prior clearing solutions, to handle redemption, payment discrepancies, or both.

As redemption transactions are written on the first redemption blockchain and the second redemption blockchain with identical veracity, payout can occur either immediately, as the redemptions are written, or on scheduled intervals. In some embodiments, payouts are initiated from the second redemption blockchain.

At a step 715, the server computer receives a payout transaction metadata from a second computing device controlled by a second entity associated with the coupon campaign. The second entity is typically a CPG manufacturer 110 in the environment 100 of FIG. 1. The payout transaction metadata is related to a payout event corresponding with a redemption transaction written on the second redemption blockchain.

In response to receiving the payout transaction metadata, the computer server posts a payout transaction to be on two distinct blockchains including a first of the two distinct blockchains associated with the first entity and a second of the two distinct blockchains associated with the coupon campaign. The payout transaction includes the payout transaction metadata.

In some embodiments, the server computer transforms the payout transaction metadata before posting a modified payout transaction that includes the transformed payout transaction metadata, to be written on the first distinct blockchain, such that not all the details associated with the payout transaction are written on the first distinct blockchain.

The two distinct blockchains are the first redemption blockchain and the second redemption blockchain. Alternatively, the two distinct blockchains are payout blockchains that are separate from the redemption blockchains. In some embodiments, the payout blockchains are configured similarly as the redemptions blockchain (for example initiated by the coupon provider 105). These two distinct blockchains form a multi-axis payout blockchain by one or more payout transactions written on both blockchains, with the same advantages as the multi-axis redemption blockchain. The multi-axis blockchains are used to clear offers without a proxy as all parties have equal information.

4.0 Technical Benefits

Techniques discussed herein recite method(s) and system(s) that allows CPG manufacturers and retailers to discontinue reliance on centralized systems with regards to coupon clearing. Using the foregoing techniques, each redemption transaction is written to at least two separate blockchains that are kept in sync and each payment transaction is written to at least two separate blockchains that are kept in sync. Since every single transaction (redemption or payout) is shared and recorded on each organization's blockchain, there is a consensus about information and data and, as such, administrative load surrounding auditing transactions is reduced or even eliminated. In addition, the decentralized redemption blockchains allow payouts to be made directly from one organization to another organization without the assistance of a third-party, dramatically improving financial efficiency and allowing organizations to be less reliant on financial institutions.

The participating nodes in each distributed network are limited to the coupon provider and an organization and, if any, approved third parties. Transaction throughput and latency are improved by limiting the size of a distributed network as there is a limited number of nodes processing each transaction. Transactions are typically grouped into blocks and every block builds on the previous hash as it carries the history of the blocks before it. Each transaction will thus need more time to be processed before it is written. However, embodiments of the present invention utilize a multi-axis blockchain comprising shorter blockchains (for example, blockchain per campaign coupon) rather than one long blockchain to reduce verification cost of each block, thereby improving processing time.

Conventional systems rely on a centralized platform, as a proxy, that is integrated and trusted by all parties in a coupon process. However, the conventional systems create an audit gap between parties as retailers, CPG manufacturers and the platform as each continues to maintain their own databases with differing counts. In the last few years, decentralized databases and distributed ledger technologies enable firms to discontinue the reliance on centralized systems; however, this technology has its limitations and latency and scale for a coupon provider's uses. Yet, the present approach addresses these issues by using a multi-axis ecosystem to decrease use of computer resources, thus improving overall computing system efficiency.

5.0 Hardware Overview

The operations/techniques described herein are implemented by one or more special-purpose computing systems or devices. For example, in the environment 100 of FIG. 1A, the computers at the coupon provider system 105, the CPG manufacturer systems 110, and the retailer systems 120 may be stand-alone computer systems or implemented by a number of interconnected computing systems.

A given computing system may be hard-wired to perform the operations described and referred to herein, or may include digital electronic devices such as one or more application-specific integrated circuits (ASICs) or field programmable gate arrays (FPGAs) that are persistently programmed to perform the operations, or may include one or more general purpose hardware processors programmed to perform the operations pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 8:
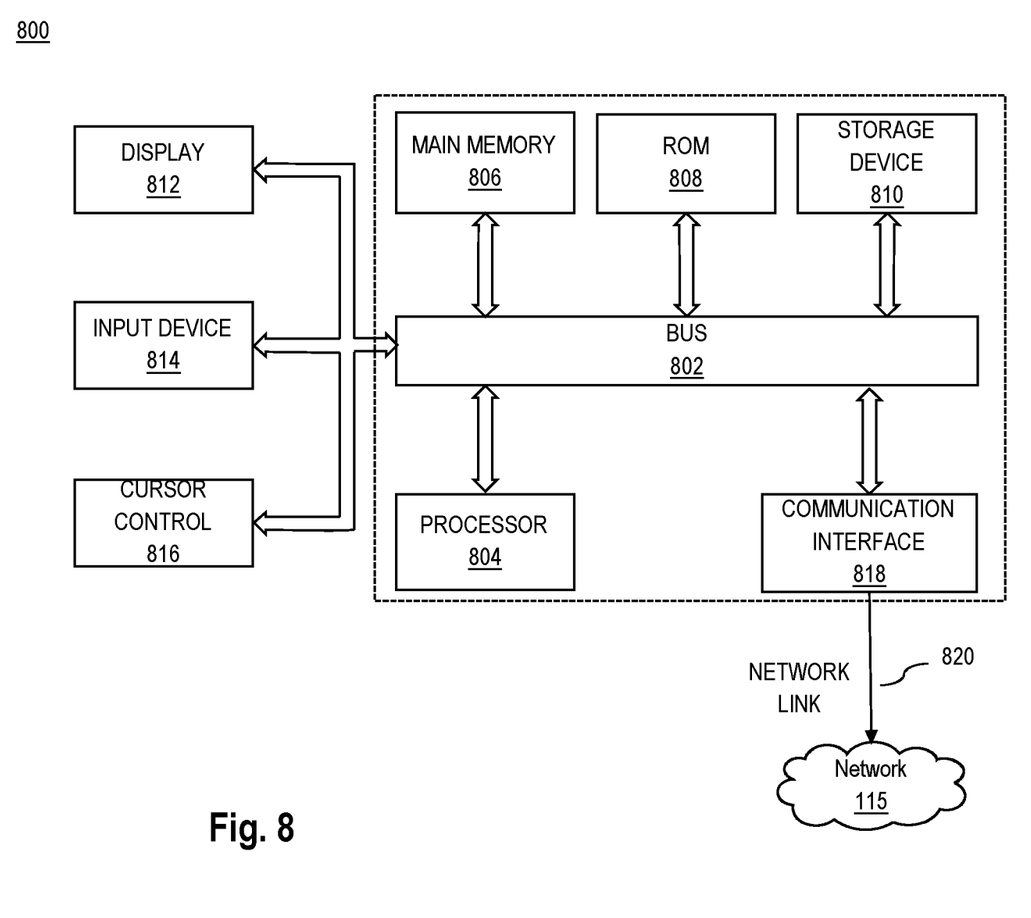
FIG. 8 illustrates an example computer system in accordance with some embodiments.

FIG. 8 illustrates an example computer system 800 in accordance with some embodiments. Operations described and referred to herein may be performed by such a computer system. For example, the computers at the coupon provider system 105, the CPG manufacturer systems 110, and the retailer systems 120 may be computer systems such as the computer system 800.

The computer system 800 includes a bus 802 or other communication mechanism for communicating information between its various components. A hardware processor 804 for processing information is also provided and is coupled with bus 802. A hardware processor 804 may be, for example, a general purpose microprocessor.

The computer system 800 also includes a main memory 806, such as a random access memory (RAM) or other dynamic storage device, coupled to the bus 802 and for storing information and instructions to be executed by the processor 804. The main memory 806 also may be used for storing temporary variables or other intermediate information during execution of instructions by the processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for processor 804. A storage device 810, such as a magnetic disk or optical disk, is provided and coupled to the bus 802 for storing information and instructions.

The computer system 800 as depicted further comprises one more output devices such as a display 812 for displaying information. The display 812 may, for example, be a cathode ray tube (CRT), a liquid crystal display (LCD), a light emitting diode (LED display), or a touch screen display. An input device 814, such as a keyboard, keypad, touch screen, is also provided (and coupled to the bus 802) for communicating information and command selections to the processor 804. Another type of user input device is cursor control 816, such as a mouse, a trackball, or cursor direction keys for communicating direction information and command selections to the processor 804 and for controlling cursor movement on the display 812. Additional and/or alternative input and output devices may be used.

In certain embodiments, the operations disclosed herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the operations described herein. In alternative embodiments, hardwired circuitry may be used in place of or in combination with software instructions.

The term "storage media" as used herein refers to any non-transitory media that stores data and/or instructions that cause a machine to operation in a specific fashion. Such storage media may comprise non-volatile media and/or volatile media. Non-volatile media includes, for example, optical or magnetic disks, such as the storage device 810. Volatile media includes dynamic memory, such as the main memory 806. Common forms of storage media include, for example, hard disks, solid state drives, magnetic tape devices (or any other magnetic data storage medium), CDs or DVDs (or any other optical data storage medium), any physical media with patterns of holes, RAM modules, a PROM modules, EPROM modules, FLASH-EPROM modules, NVRAM modules, or any other memory chip, cartridge or device.

Storage media is distinct from, but may be used in conjunction with, transmission media. Transmission media participates in transferring information between storage media. For example, transmission media includes coaxial cables, copper wire and fiber optics, including the wires that comprise the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may be carried on a portable storage medium (for example a disk or drive), loaded into dynamic memory, sent over a telephone line or other communication network. The bus 802 carries the instructions to the main memory 806, from which the processor 804 retrieves and executes the instructions. The instructions received by the main memory 806 may optionally be stored on the storage device 810 either before or after execution by the processor 840.

The computer system 800 also includes a communication interface 818 coupled to the bus 802. The communication interface 818 provides a two-way data communication coupling to a network link 820 that is connected to a network such as the network 115 of FIG. 1. For example, the communication interface 818 may be an integrated services digital network (ISDN) card, cable modem, satellite modem, or a modem to provide a data communication link to a corresponding type of telephone line. As another example, the communication interface 818 may be a network interface card which provides a data communication link to a compatible local area network. Wireless links may also be implemented. In any such implementation, the communication interface 818 sends and receives electrical, electromagnetic or optical signals that carry digital data streams representing various types of information.

The network link 820 typically provides data communication through one or more networks 115 to other computing systems. For example, if the computing system 800 is a computer at a CPG manufacturer system 110, the network link 820 will provide a connection through the network 115 to the coupon provider system 105. For another example, if the computing system 800 is a computer at a retailer system 120, the network link 820 will provide a connection through the network 115 to the coupon provider system 105.

The computer system 800 can send messages and receive data, including transaction data, through the network 115, the network link 820 and the communication interface 818.

6.0 Other Aspects of Disclosure

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for implementing a coupon campaign across multiple blockchains, the method performed by a coupon provider server, the method comprising:
constructing, for the coupon campaign, a first redemption blockchain as a private blockchain between the coupon provider server and a first computing device controlled by a first entity;
constructing, for the coupon campaign, a second redemption blockchain as a private blockchain between the coupon provider server and a second computing device controlled by a second entity;
receiving first redemption metadata from the first computing device, the first redemption metadata relating to a point of sale transaction associated with a coupon associated with the coupon campaign;
generating a second redemption metadata based on a modification of the first redemption metadata, the second redemption metadata comprising information relating to the point of sale transaction that has been de-sensitized;
in response to approving the coupon for redemption, posting a first redemption transaction on the first redemption blockchain based on the first redemption metadata and further posting a second redemption transaction on the second redemption blockchain based on the second redemption metadata, the first computing device being restricted from accessing the second redemption blockchain and the second computing device being restricted from accessing the first redemption blockchain;
receiving payout transaction metadata from the second computing device the payout transaction metadata relating to a payout event that corresponds with the second redemption transaction posted on the second redemption blockchain.

2. The method of claim 1, wherein the first redemption blockchain and the second redemption blockchain form a multi-axis redemption blockchain by one or more redemption transactions posted on both the first redemption blockchain and the second redemption blockchain.

3. The method of claim 1, wherein the first redemption blockchain is distributed to nodes within a first distributed network including a server computer and the first computing device, wherein the second redemption blockchain is distributed to nodes within a second distributed network including the server computer and the second computing device.

4. The method of claim 1, further comprising, prior to receiving the first redemption metadata, initializing the first redemption blockchain and the second redemption blockchain.

5. The method of claim 1, further comprising, after receiving payout transaction metadata, posting a payout transaction on two distinct blockchains, a first of the two distinct blockchains being associated with the first entity and a second of the two distinct blockchains being associated with the coupon campaign, the payout transaction including at least a portion of the payout transaction metadata.

6. The method of claim 5, wherein the two distinct blockchains are separate from the first redemption blockchain and the second redemption blockchain.

7. The method of claim 5, wherein the first of the two distinct blockchains is the first redemption blockchain and the second of the two distinct blockchains is the second redemption blockchain.

8. One or more non-transitory computer-readable media storing instructions which, when processed by one or more processors of a coupon provider server implementing a coupon campaign, cause the one or more processors to perform:
constructing, for the coupon campaign, a first redemption blockchain as a private blockchain between the coupon provider server and a first computing device controlled by a first entity;
constructing, for the coupon campaign, a second redemption blockchain as a private blockchain between the coupon provider server and a second computing device controlled by a second entity;
receiving first redemption metadata from the first computing device, the first redemption metadata relating to a point of sale transaction associated with a coupon associated with the coupon campaign;
generating a second redemption metadata based on a modification of the first redemption metadata, the second redemption metadata comprising information relating to the point of sale transaction that has been de-sensitized;
in response to approving the coupon for redemption, posting a first redemption transaction on the first redemption blockchain based on the first redemption metadata and further posting a second redemption transaction on the second redemption blockchain based on the second redemption metadata, the first computing device being restricted from accessing the second redemption blockchain and the second computing device being restricted from accessing the first redemption blockchain;
receiving payout transaction metadata from the second computing device, the payout transaction metadata relating to a payout event that corresponds with the second redemption transaction posted on the second redemption blockchain.

9. The one or more non-transitory computer-readable media of claim 8, wherein the first redemption blockchain and the second redemption blockchain form a multi-axis redemption blockchain by one or more redemption transactions posted on both the first redemption blockchain and the second redemption blockchain.

10. The one or more non-transitory computer-readable media of claim 8, wherein the first redemption blockchain is distributed to nodes within a first distributed network including a server computer and the first computing device, wherein the second redemption blockchain is distributed to nodes within a second distributed network including the server computer and the second computing device.

11. The one or more non-transitory computer-readable media of claim 8, further comprising instructions which, when processed by one or more processors, further cause the one or more processors to perform, prior to receiving the first redemption metadata, initializing the first redemption blockchain and the second redemption blockchain.

12. The one or more non-transitory computer-readable media of claim 8, further comprising instructions which, when processed by one or more processors, further cause the one or more processors to perform, after receiving payout transaction metadata, posting a payout transaction on two distinct blockchains, a first of the two distinct blockchains being associated with the first entity and a second of the two distinct blockchains being associated with the coupon campaign, the payout transaction including at least a portion of the payout transaction metadata.

13. The one or more non-transitory computer-readable media of claim 12, wherein the two distinct blockchains are separate from the first redemption blockchain and the second redemption blockchain.

14. The one or more non-transitory computer-readable media of claim 12, wherein the first of the two distinct blockchains is the first redemption blockchain and the second of the two distinct blockchains is the second redemption blockchain.

15. A computer system comprising:
one or more processors of a coupon provider server implementing a coupon campaign; and
one or more memories communicatively coupled to the one or more processors and storing instructions which, when processed by the one or more processors, cause the one or more processors to perform:
constructing, for the coupon campaign, a first redemption blockchain as a private blockchain between the coupon provider server and a first computing device controlled by a first entity;
constructing, for the coupon campaign, a second redemption blockchain as a private blockchain between the coupon provider server and a second computing device controlled by a second entity;
receiving first redemption metadata from the first computing device, the first redemption metadata relating to a point of sale transaction associated with a coupon associated with the coupon campaign;

generating a second redemption metadata based on a modification of the first redemption metadata, the second redemption metadata comprising information relating to the point of sale transaction that has been de-sensitized;

in response to approving the coupon for redemption, posting a first redemption transaction on the first redemption blockchain based on the first redemption metadata and further posting a second redemption transaction on the second redemption blockchain based on the second redemption metadata, the first computing device being restricted from accessing the second redemption blockchain and the second computing device being restricted from accessing the first redemption blockchain;

receiving payout transaction metadata from the second computing device, the payout transaction metadata relating to a payout event that corresponds with the second redemption transaction posted on the second redemption blockchain.

16. The computer system of claim 15, wherein the first redemption blockchain and the second redemption blockchain form a multi-axis redemption blockchain by one or more redemption transactions posted on both the first redemption blockchain and the second redemption blockchain.

17. The computer system of claim 15, wherein the first redemption blockchain is distributed to nodes within a first distributed network including the server computer and the first computing device, wherein the second redemption blockchain is distributed to nodes within a second distributed network including the server computer and the second computing device.

18. The computer system of claim 15, wherein the instructions which, when processed by the one or more processors of the server computer, further cause the one or more processors to perform, prior to receiving the first redemption metadata, initializing the first redemption blockchain and the second redemption blockchain.

19. The computer system of claim 15, wherein the instructions which, when processed by the one or more processors of the server computer, further cause the one or more processors to perform, prior to initializing the first redemption blockchain and the second redemption blockchain, generating the coupon associated with the coupon campaign.

20. The computer system of claim 15, wherein the instructions which, when processed by the one or more processors of the server computer, further cause the one or more processors to perform, after receiving payout transaction metadata, posting a payout transaction on two distinct blockchains, a first of the two distinct blockchains being associated with the first entity and a second of the two distinct blockchains being associated with the coupon campaign, the payout transaction including at least a portion of the payout transaction metadata.

* * * * *